Aug. 26, 1958
J. BELART
2,849,681
ELECTRICAL PROBE
Filed Dec. 21, 1955
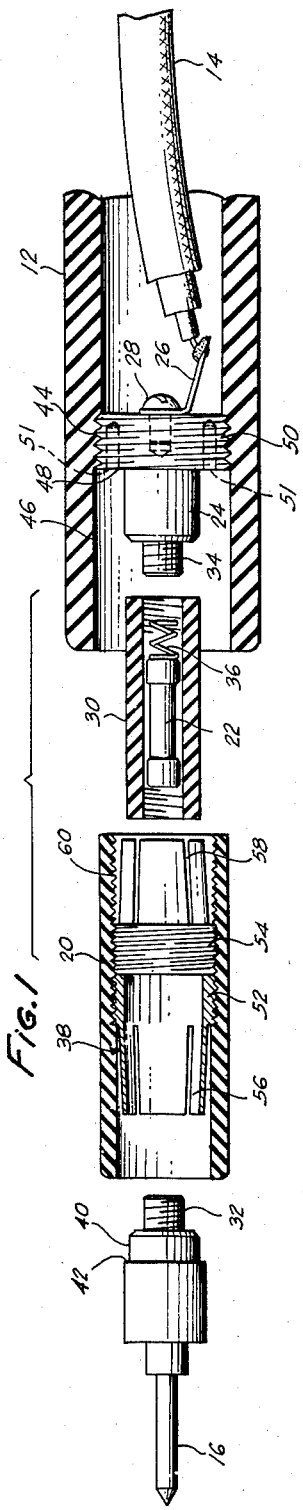
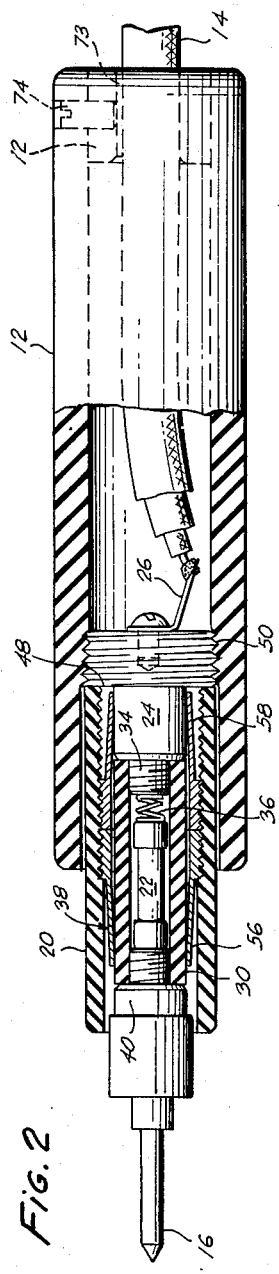
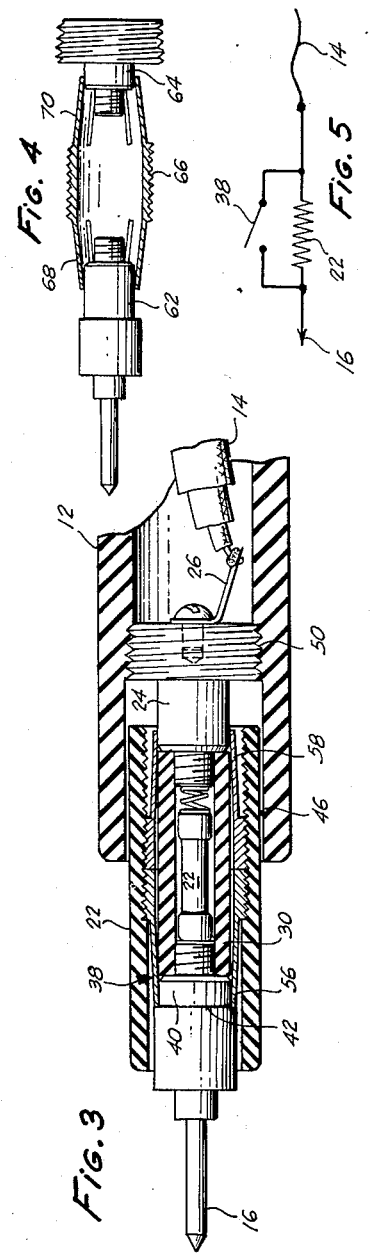
INVENTOR.
JOSE BELART
BY
James and Franklin
ATTORNEYS.

United States Patent Office 2,849,681
Patented Aug. 26, 1958

2,849,681

ELECTRICAL PROBE

José Belart, Jamaica, N. Y., assignor to Precision Apparatus Co., Inc., Glendale, N. Y., a corporation of New York Application December 21, 1955, Serial No. 554,527

10 Claims. (Cl. 324—149)

This invention relates to electrical probes, and more particularly to those intended for use with or without a resistor in series for isolation or for multiplying or other purpose.

The primary object of the present invention is to generally improve electrical probes. A more particular object is to provide a probe having a resistor which may be either connected in series between the tip and the connecting cable which leads to the meter or other instrument, or which may be shunted or short circuited or made ineffective so that the tip is connected directly to the cable.

Another object of the invention is to provide a slidable means to change the probe, which means is easily manipulated yet highly frictional, so that it will not shift accidentally. A further object is to provide means for producing a good electrical contact between the movable parts. A further object is to provide a switching arrangement which does not increase the overall size of the probe. Still another object is to provide a switching means which does not require a switch handle projecting from the side of the probe handle. Differently expressed, the probe handle remains smooth, cylindrical and unmarred, and the probe may be used in any rotative position around its longitudinal axis.

To accomplish the foregoing general objects, and other more specific objects which will hereinafter appear, my invention resides in the electrical probe elements, and their relation one to another, as are hereinafter more particularly described in the following specification. The specification is accompanied by a drawing, in which:

Fig. 1 is a longitudinal section showing the parts of the probe in disassembled relation;

Fig. 2 is a similar section showing the assembled probe with the resistor in series;

Fig. 3 is a fragmentary section, similar to Fig. 2, but showing the relation of the parts when the slide is moved forward to shunt the resistor;

Fig. 4 is a section through the slidable switch elements, showing a modification; and Fig. 5 is a schematic wiring diagram for the probe.

Referring to the drawing, and more particularly to Fig. 2, the probe comprises a handle 12 at the end of a flexible insulated conductor 14, the said handle carrying a tip 16. A sleeve 20 is axially slidable relative to the handle and tip. In Fig. 2 it is shown in its retracted position, while in Fig. 3 it is shown in its forward position. A resistor cartridge 22 is disposed in series between the tip 16 and the cable 14, and in one position of the sleeve 20 the resistor 22 is short circuited, while in the other position of sleeve 20 it is not.

The main parts of the probe are shown in disassembled relation in Fig. 1. The probe comprises a metal tip 16 and an insulation handle 12 which has a metal back contact 24 therein. The flexible cable 14 is electrically connected to the back contact 24, in this case by means of a soldering lug 26 and a screw 28. A hollow insulation bushing 30 serves to structurally connect the back contact 24 and the tip 16, and thus serves to mount the tip 16 rigidly on handle 12.

In the preferred structure here shown the tip 16 has a threaded stud 32 which projects rearwardly, while the back contact 24 has a threaded stud 34 which projects forwardly. The bushing 30 is internally threaded at both ends to receive the studs 32 and 34 respectively. Thus the parts may be screwed together as shown in Figs. 2 and 3, with stud 34 supporting the bushing 30, and the latter supporting the tip 16. Transverse sections are not shown but it will be understood that in such sections the parts are all circular. The resistor 22 is housed in the bushing 30, and is electrically connected in series between the studs, as by means of a compression spring 36 at one end of the resistor.

The slidable sleeve 20 is made of insulation and it surrounds the bushing 30. It carries a contact spring generally designated 38, and this is secured inside the sleeve 20 and extends longitudinally of the sleeve. It moves axially with the sleeve between end or terminal positions. In one terminal position, that shown in Fig. 3, the contact spring connects the tip 16 to the back contact 24, and thereby short circuits the resistor 22. In the other terminal position, that shown in Fig. 2, the spring 38 has been withdrawn from contact with the tip 16, and thus leaves the resistor 22 in series.

Considering the illustrated structure in greater detail, the metal tip 16 has not only the threaded stud 32 but also a cylindrical contact portion 40, and a stop shoulder 42. The handle 12 is preferably a hollow cylindrical handle made of a piece of suitable insulation tubing. It is internally threaded at 44 (Fig. 1), and cut away to clear the threads at 46. The back contact has a cylindrical contact portion 24, the threaded stud 34, a stop shoulder 48, and a threaded part 50 dimensioned to mate with the handle thread 44. The back contact may be provided with diametrically related holes 51 which receive the ends of a suitable spanner wrench to help screw the contact tightly into the handle.

The insulation bushing 30 preferably has an outside diameter substantially the same at that of the cylindrical front and back contacts 40 and 24, but this is not essential. The slidable insulation sleeve 20 preferably has a diameter smaller than that of the inside of the handle at 46, and larger than that of the cylindrical contacts 40 and 24. The sleeve is preferably disposed concentrically of the handle and contacts, and the metal contact spring 38 is preferably itself a cylindrical element. In the present case it is made of two parts each of which is threaded at one end, as shown at 52 and 54 (Fig. 1), and tapered and longitudinally slit at the other end to form a ring of somewhat convergent spring fingers, as shown at 56 and 58. The sleeve 20 is internally threaded for about half its length, as shown at 60, and the parts 52 and 54 are screwed tightly into the sleeve in order to lock them in the sleeve and against one another. This provides good electrical contact from part 52 to part 54. The spring fingers 56 are dimensioned to slide frictionally on cylindrical contact 40, while the spring fingers 58 are dimensioned to slide frictionally on the cylindrical contact 24. These may differ in diameter, but in the simplest case here shown they are alike in diameter.

One contact, in this case contact 24, is substantially longer than the other contact 40. Thus when the sleeve 22 is moved forward, as shown in Fig. 3, the spring fingers 56 slide over the contact 40, while the spring fingers 58 remain on the contact 24. This forward terminal position of the sleeve is determined by the stop shoulder 42, against which the fingers 56 abut.

In the opposite terminal position shown in Fig. 2 the spring fingers 58 slide along the contact 24, while the spring fingers 56 leave the contact 40 and move onto the bushing 30. It is for this reason that the bushing preferably has the same diameter as the contact 40, but obviously it could be smaller in diameter if the end of contact 40 is bevelled, and it could be slightly though not much larger in diameter. The terminal position shown in Fig. 2 is determined by the stop shoulder 48, which may be engaged either by the spring fingers 53, or by the end of sleeve 20 as here shown, or both simultaneously.

The materials used in constructing the probe are not critical. However, in one preferred form of the probe the metal tip 16 with its associated parts is made of a single integral piece of brass. The rear contact 24 with its associated parts is made of a single integral piece of brass. The slidable contact spring 38 is made of brass. The insulation bushing 30 which houses the resistor and which structurally connects the tip to the handle, may be made of acetate or nylon plastics, or a phenolic condensation product. The slidable sleeve 20 and the handle 12 may be made of a suitable plastics material, either acetate or a phenolic condensation product. This statement of materials is not intended to be in limitation of the invention.

If desired, the cable 14 may be anchored to prevent pull on the soldered connection, this being shown in Fig. 2 in which the handle includes an insulation collar 72 and a blunt set screw 74 which bears against a flat metal strip 73 inserted between the collar and the cable.

Fig. 4 is schematic, and shows a front contact 62, a back contact 64, and a cylindrical spring 66 having spring fingers 68 and 70. The other parts may be the same as already described. One difference in Fig. 4 is that in this case the back contact 64 is made short, while the front contact 62 is made long. This reverses the action, that is, the resistor is short circuited when the slide sleeve is pulled back into the handle, and is made effective when the sleeve is pushed forward. Another difference in Fig. 4 is that the fingers 68 and 70 are formed integrally with a single threaded mid-portion 66. It is not essential to make the cylindrical spring of two parts as shown in Figs. 1–3. Using two parts has the advantage that they may be locked in position by screwing one part tightly against the other, as is done with locknuts. If one part is used, as in Fig. 4, a set screw or other locking means should be used.

The electrical circuit of the probe is represented in Fig. 5, in which it will be seen that the probe tip 16 is connected to the flexible conductor 14 through a resistor 22, which may be short circuited by means of a switch 38 which, of course, corresponds to the slidable spring contact.

The resistor provided in the probe may be used for several purposes. One is to act as a voltage multiplier for the instrument or meter to which the probe is connected. Another is to provide isolation between the input capacitance of a vacuum tube voltmeter and a circuit being tested. The resistor is put in series when probing a D. C. circuit. When the vacuum tube voltmeter is switched to the A. C. testing position the resistor is not required. Also when the vacuum tube voltmeter is switched for use as an ohm meter, the resistor is not required. In either case it is readily shunted out of circuit by the probe here disclosed.

The probe may be used in other ways and with other instruments than a vacuum tube voltmeter. It may be used in any situation where it is desired to put an impedance, typically a resistor, into or out of circuit between the tip and cable of a probe.

It is believed that the method of constructing and using my improved probe, as well as the advantages thereof, will be apparent from the foregoing detailed description. The handle may be smooth, cylindrical and unmarred by a projecting switch knob, lever or the like. The slidable sleeve is readily accessible for intentional movement into or out of the handle, but is unlikely to experience accidental movement, first, because of its shape and dimension, and, secondly, because the cylindrical spring maintains a rather tight frictional movement relative to the cylindrical contacts so that the sleeve is not likely to be accidentally moved. The cylindrical nature of all of the parts makes it possible to rotate the sleeve relative to the handle without affecting the probe.

It will be understood that while I have shown and described my invention in several preferred forms, changes may be made in the structures shown, without departing from the scope of the invention, as sought to be defined in the following claims.

I claim:

1. An electrical probe comprising a fixed tip and an insulation handle having a back contact therein, a conductor leading to said handle and connected to said back contact, a resistor connected in series between said tip and said back contact, a slidable sleeve made of insulation and surrounding said resistor, and a contact spring secured inside of and extending longitudinally of said sleeve, said spring being so shaped that it exerts its resilient contact pressure radially of the sleeve, said spring being slidable axially with said sleeve between one position in which the spring connects the tip and the back contact and thereby short circuits the resistor, and another position in which the spring does not connect the tip and the back contact and thus leaves the resistor in series.

2. An electrical probe comprising a tip and an insulation handle having a back contact therein, a conductor leading to said handle and connected to said back contact, a hollow insulation bushing structurally fixedly connecting said tip and said handle, a resistor housed in said bushing and connected in series between said tip and said back contact, a slidable sleeve made of insulation and surrounding said bushing, and a contact spring secured inside of and extending longitudinally of said sleeve, and slidable axially with said sleeve between one position in which the spring connects the tip and the back contact and thereby short circuits the resistor, and another position in which the spring does not connect the tip and the back contact and thus leaves the resistor in series.

3. An electrical probe comprising a metal tip and an insulation handle having a metal back contact therein, an insulated flexible cable leading to said handle and connected to said back contact, a hollow insulation bushing rigidly concentrically connecting said tip and said handle, a resistor housed in said bushing and connected in series between said tip and said back contact, a slidable sleeve made of insulation and concentrically surrounding said bushing, and a metal contact spring secured inside of and extending longitudinally of said sleeve and slidable axially with said sleeve between one position in which the spring connects the tip and the back contact and thereby short circuits the resistor, and another position in which the spring does not connect the tip and the back contact and thus leaves the resistor in series, said spring being so shaped that it exerts its resilient contact pressure radially of the sleeve.

4. An electrical probe comprising a metal tip having a front contact including a stud and a contact portion, an insulation handle, said handle having a metal back contact with a stud, an insulated flexible cable leading to said handle and connected to said back contact, a hollow insulation bushing secured to said studs projecting from said front and back contacts and thereby rigidly connecting the tip to the handle, a resistor housed in said bushing and connected in series between the front and back contacts, a slidable insulation sleeve surrounding said contacts, and a metal contact spring secured inside said sleeve and slidable in axial direction with said sleeve, the arrangement being such that in one terminal position one end of the spring bears against the contact portion of said front contact while the other end of the spring bears against the contact portion of the back contact, thereby short circuiting the resistor, and in its other terminal position one end of the spring leaves one of the contacts.

5. An electrical probe comprising a metal tip having a front contact including a stud and a contact portion which is larger in diameter than the stud, an insulation handle, said handle having a metal stud and back contact which is larger in diameter than the stud, an insulated flexible cable leading to said handle and connected to said back contact, a hollow insulation bushing secured to said studs projecting from said front and back contacts and thereby rigidly connecting the tip to the handle, the outside diameter of the bushing being substantially the same as that of the contacts, a resistor housed in said bushing and connected in series between the front and rear contacts, a slidable insulation sleeve surrounding said contacts, and a metal contact spring secured inside said sleeve and slidable in axial direction with said sleeve, said spring being so shaped that it exerts its resilient contact pressure radially of the sleeve, the arrangement being such that in one terminal position one end of the spring bears against the contact portion of said front contact while the other end of the spring bears against the contact portion of the back contact, thereby short circuiting the resistor, and in its other terminal position one end of the spring leaves one of the contacts, the axial length of one of said contacts being substantially greater than the axial length of the other contact, whereby the spring remains in engagement with the longer contact in either terminal position of the slidable sleeve.

6. An electrical probe comprising a metal tip having a front contact including a threaded stud and a cylindrical contact portion, a cylindrical insulation handle of greater diameter than the other parts of the probe, said handle having a metal cylindrical back contact with a threaded stud, an insulated flexible cable leading to said handle and connected to said back contact, a hollow insulation bushing internally threaded and screwed to said threaded studs projecting from said front and back contacts and thereby rigidly connecting the tip to the handle, a resistor housed in said bushing and connected in series between the front and back contacts, a slidable insulation sleeve having a diameter greater than that of the cylindrical contacts and smaller than that of the handle, said sleeve surrounding said contacts, and a metal contact spring secured inside said sleeve and slidable in axial direction with said sleeve, the arrangement being such that in one terminal position one end of the spring bears against the outside of said cylindrical front contact while the other end of the spring bears against the outside of said cylindrical back contact, thereby short-circuiting the resistor, and in its other terminal position one end of the spring leaves one of the contacts.

7. An electrical probe comprising a metal tip having a front contact including a threaded stud and a cylindrical contact portion which is larger in diameter than the stud, a cylindrical insulation handle of greater diameter than the other parts of the probe, said handle having a metal cylindrical back contact with a threaded stud, said contact being larger in diameter than the stud, an insulated flexible cable leading to said handle and connected to said back contact, a hollow insulation bushing internally threaded and screwed to said threaded studs projecting from said front and back contacts and thereby rigidly connecting the tip to the handle, the outside diameter of the bushing being substantially the same as that of the contacts, a resistor housed in said bushing and connected in series between the front and back contacts, a slidable insulation sleeve having a diameter greater than that of the cylindrical contacts and smaller than that of the handle, said sleeve surrounding said contacts, and a metal contact spring secured inside said sleeve and slidable in axial direction with said sleeve, said spring being so shaped that it exerts its resilient contact pressure radially of the sleeve, the arrangement being such that in one terminal position one end of the spring bears against the outside of said cylindrical front contact while the other end of the spring bears against the outside of said cylindrical back contact, thereby short-circuiting the resistor, and in its other terminal position one end of the spring leaves one of the contacts, the axial length of one of said cylindrical contacts being substantially greater than the axial length of the other cylindrical contact, whereby the spring remains in engagement with the longer contact in either terminal position of the slidable sleeve.

8. An electrical probe comprising a metal tip having a front contact including a threaded stud, a cylindrical contact portion and a stop shoulder, a cylindrical insulation handle of greater diameter than the other parts of the probe, said handle having a metal cylindrical back contact with a stop shoulder and a threaded stud, an insulated flexible cable leading to said handle and connected to said back contact, a hollow insulation bushing internally threaded and screwed to said threaded studs projecting from said front and back contacts and thereby rigidly connecting the tip to the handle, a resistor housed in said bushing and connected in series between the front and back contacts, a slidable insulation sleeve having a diameter greater than that of the cylindrical contacts and smaller than that of the handle, said sleeve surrounding said contacts, and a generally cylindrical metal contact spring secured inside said sleeve and around said cylindrical contacts and bushing, and slidable in axial direction with said sleeve, the arrangement being such that in one terminal position one end of the cylindrical spring bears against the outside of said cylindrical front contact while the other end of the cylindrical spring bears against the outside of said cylindrical back contact, thereby short-circuiting the resistor, and in its other terminal position one end of the cylindrical spring leaves one of the contacts, the motion of said sleeve and spring being limited by the aforesaid stop shoulders, and the axial length of one of said cylindrical contacts to its stop shoulder being substantially greater than the axial length of the other cylindrical contact to its stop shoulder, whereby the cylindrical spring remains in engagement with the longer contact in either terminal position of the slidable sleeve.

9. An electrical probe comprising a metal tip having a front contact including a threaded stud, a cylindrical contact portion and a stop shoulder of progressively increased diameter, a cylindrical insulation handle of greater diameter than the other parts of the probe, said handle having a metal cylindrical back contact with a stop shoulder, a contact portion, and a threaded stud of progressively decreased diameter, an insulated flexible cable leading to said handle and connected to said back contact, a hollow insulation bushing having an outside diameter substantially the same as that of the cylindrical front and back contacts, said bushing being internally threaded and screwed to said threaded studs projecting from said front and back contacts and thereby rigidly connecting the tip concentrically to the handle, a resistor housed in said bushing and connected in series between the front and back contacts, a slidable insulation sleeve having a diameter greater than that of the cylindrical contacts and smaller than that of the handle, said sleeve being disposed concentrically of the handle and contacts, and a generally cylindrical metal contact spring secured inside said sleeve and around said cylindrical contacts and bushing, and slidable in axial direction with said sleeve, the arrangement being such that in one terminal position one end of the cylindrical spring bears against the outside of said cylindrical front contact while the other end of the cylindrical spring bears against the outside of said cylindrical back contact, thereby short-circuiting the resistor, and in its other terminal position one end of the cylindrical spring leaves one of the contacts and moves onto the insulation bushing, the motion of said sleeve and spring being limited by the aforesaid stop shoulders, and the axial length of one of said cylindrical contacts to its stop shoulder being substantially greater than the axial length of the other cylindrical contact to its stop shoulder, whereby the cylindrical spring remains in engagement with the longer contact in either terminal position of the slidable sleeve.

10. An electrical probe comprising an immovable metal tip and a tubular insulation handle having a metal back contact therein, an insulated flexible cable leading to said handle and connected to said back contact, a resistor connected in series between said tip and said back contact, a slidable sleeve made of insulation and concentric with said handle, said sleeve being smaller in diameter than the handle and projecting from the lower end of the handle, and a metal contact spring operated by axial movement of said sleeve between one position in which the spring connects the tip and the back contact and thereby short-circuits the resistor, and another position in which the spring does not connect the tip and the back contact thus leaving the resistor in series said spring being so shaped that it exerts its resilient contact pressure radially of the sleeve.

References Cited in the file of this patent

FOREIGN PATENTS

| | | |
|---|---|---|
| 695,684 | France | Dec. 19, 1930 |
| 495,485 | Great Britain | Nov. 15, 1938 |